March 4, 1952 G. HOHWART ET AL 2,588,116
ADJUSTABLE RING GAUGE
Filed July 26, 1946

INVENTORS.
George Hohwart,
Ernest F. Hohwart.
BY Harness, Dickey & Pierce.
ATTORNEYS.

Patented Mar. 4, 1952

2,588,116

UNITED STATES PATENT OFFICE 2,588,116

ADJUSTABLE RING GAUGE

George Hohwart and Ernest F. Hohwart, Detroit, Mich., assignors to N. A. Woodworth Company, Ferndale, Mich., a corporation of Michigan Application July 26, 1946, Serial No. 686,492

6 Claims. (Cl. 33—199)

This invention relates broadly to new and useful improvements in radially adjustable devices such as ring gages and journal bearings and particularly to a novel construction for thread ring gages and the like.

In the drawings the inventive concept is shown embodied in a thread ring gage, and the specification is limited to a description of this embodiment; however, it is to be understood that the principles and concept of this invention can be incorporated in any device or mechanism where it is necessary to adjust an annular member radially from time to time and to maintain substantially exact circularity of the same throughout the range of adjustment.

It is conventional practice to make ring gages having radially adjustable inner and outer members. In these gages both members have adjusting slots which extend radially therethrough and permit them to be either expanded or contracted. The outer member or body is equipped with a clamp screw and, when tightened, this screw draws the body solidly against the inner member or insert. In this manner radially contracting forces are exerted against the insert by the body. Also, the body is equipped with an adjusting screw which seats against the spaced ends of the insert and, when tightened, expands the latter radially outwardly against the body.

In the case of thread ring gages, the ends of the insert can be uniquely formed to compensate for axial offset produced in the threads at opposite sides of the adjusting slot due to contraction of the insert. A thread ring gage of this type is shown in our copending application Serial No. 653,571 which was filed March 11, 1946.

Both the body and insert are conventionally made of metal or other relatively rigid material, and it is exceedingly difficult to adjust them radially and at the same time maintain true circularity of the gage opening. However, adjustment is necessary in order that the device properly perform its intended function. In the case of ring gages, it is necessary that such adjustment be made initially to insure a proper fit with the work and from time to time thereafter to compensate for wear. Since it is necessary to maintain an exceedingly fine tolerance between the gage opening and the part being tested and since the latter is a true cylinder, the desirability of maintaining true circularity of the gage opening is at once apparent. In any event the problem of maintaining true circularity of the gage opening is a primary one and it is regarded very seriously by the industry.

In the past, various solutions to the problem have been suggested. One expedient that has proved satisfactory is to make both the insert and the body eccentric in plan with the adjusting slots at the thinnest portions thereof and disposed substantially 180° apart. Such a construction is shown in our copending application hereinabove referred to. However, the eccentric shape of these members and the relatively fine tolerances that must be maintained makes them relatively difficult and expensive to manufacture. It is easier and cheaper to make these members with concentric inner and outer edges, but heretofore it has been impossible to maintain the gage opening truly circular when they are so formed.

It has now been discovered that substantially true circularity of the gage bore can be maintained over a relatively wide range of adjustment even though both the body and the insert are concentric in plan if these members are assembled with the adjusting slot of one substantially at right angles to the adjusting slot of the other. When arranged in this manner each member apparently corrects or compensates any tendency of the other to elongate when adjusted.

From the foregoing it will be readily appreciated that an important object of this invention is to provide an adjustable ring gage or the like that can be adjusted radially without destroying true circularity of the gage opening.

Another object of the invention is to provide an adjustable ring gage that is easier and less expensive to manufacture.

Still another object of the invention is to provide an adjustable ring gage that is efficient in operation.

Other objects and advantages of the invention will be apparent during the course of the following description.

In the drawing forming a part of this specification and wherein like numerals are employed to designate like parts throughout the same, Fig. 1 is a plan view of a thread ring gage embodying the invention;

Figure 1:
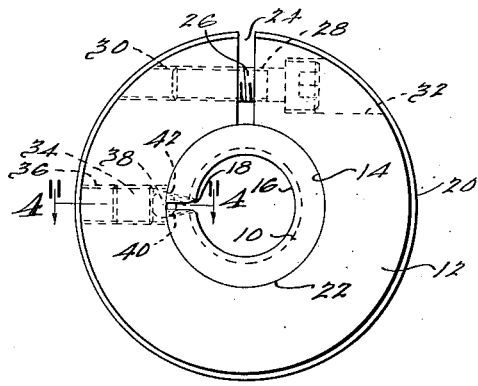
Figure 2:
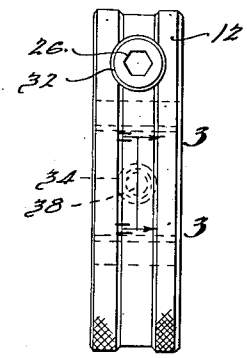
Fig. 2 is an edgewise elevational view of the same.
Figure 3:
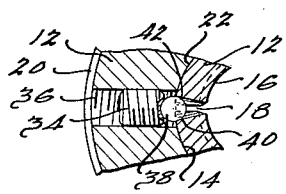
Fig. 3 is a fragmentary vertical sectional view taken on the line 3—3 of Fig. 2.
Figure 4:
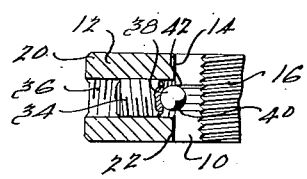
Fig. 4 is a fragmentary, transverse sectional view taken on the line 4—4 of Fig. 1.

Reference is first had to Figs. 1-4 which show a preferred embodiment of the invention. The insert is designated by the numeral 10 and the body by the numeral 12. Both the insert and the body are generally circular in shape, as shown in Fig. 1, and are relatively thick, as shown in Fig. 2. The insert 10 may be made of hardened steel; however, it preferably is made from a material known to the trade as "Nawlide," since the latter has superior wearing properties. The body 12 preferably is made of aluminum. When thus constructed the gage is 40% lighter in weight than the standard AGD gage. This is important in a device of this character since the reduced weight results in less friction and assures a more sensitive feel.

As best shown in Fig. 1, the insert 10 has a generally cylindrical peripheral surface 14 and is provided with a concentrically positioned, internally screw-threaded opening 16 which is adapted to receive and snugly fit an externally screw-threaded workpiece. In accordance with practices well known in the art, the opening 16 may be provided with threads of any suitable type or size, depending on the character of the particular work to be tested. At any suitable point along its circumference the insert 10 is provided with an adjusting slot 18 which extends radially entirely therethrough and permits radial expansion and contraction of the same.

The body 12 also has a generally cylindrical peripheral surface 20 and is provided with a concentrically positioned opening 22 which receives and snugly fits the cylindrical periphery 14 of the insert 10. At any suitable point along the circumference of the body 12 is an adjusting slot 24 which extends radially therethrough and permits radial expansion and contraction of the same. It will be observed, however, that the insert 10 and body 12 are arranged in such relation to each other that the slots 18 and 24 are disposed substantially at right angles. As suggested, this relationship is important in maintaining a high degree of circularity of the gage opening 16 throughout the range of adjustment and permits the use of concentrically formed insert and body members.

The body 12 preferably is suitably colored to distinguish the "go" from the "no go" gage, and this may be done conveniently by anodizing or other processes well known to the art. Green is conventionally used to designate the "go" gage and red to designate the "no go" gage. Not only does this process add color and beauty to the product, but it also helps the operator to identify the gages.

Adjustment of the body 12 is effected by a clamp screw 26 which is disposed in aligning openings 28 and 30 and extends transversely across the adjusting slot 24. In order that no parts project from the body 12 and to provide a radial shoulder for the screw head, the latter is recessed in a countersink 32 at the outer end of opening 28. Opening 30 is internally screw-threaded to engage the external threads of screw 26 so that tightening of the screw radially contracts the body 12 and insert 10. When screw 26 is tightened it pulls the body 12 tightly against insert 10 to contract the same.

When adjusting the gage it also is desirable to expand the insert 10 against the body 12 and this is accomplished by an adjusting screw 34 which is disposed in an internally screw-threaded, radially extending opening 36 provided in the body 12. As shown in Fig. 1, the opening 33 is positioned substantially at right angles to the adjusting slot 24 and in alignment with the adjusting slot 18. Confined between insert 10 and adjusting screw 34 and projecting into the adjusting slot 18 is a ball detent 38. The walls of the slot preferably are beveled as at 40 and 42 to provide seats for the detent. Manifestly, tightening of adjusting screw 32 forces the ball detent 38 solidly against the seats 40 and 42 to expand the insert 10 against the body 12. Moreover, it will be readily apparent that radially contracting forces exerted against insert 10 by body 12 also are transmitted through the ball detent to automatically effect such expansion even though the position of adjusting screw 34 is not altered or changed.

In thread ring gages the seats 40 and 42 preferably are formed with coined bearing surfaces arranged to engage the ball detent 36 at opposite sides of diametric plane through the center of the latter in the manner shown and described in our copending application hereinabove referred to, so that the radially expanding forces imposed on the insert 10 also flex the ends of the insert axially in opposite directions to compensate for axial offset produced in the threads at opposite sides of the adjusting slot due to radial adjustment of the insert.

In order to adjust the gage the usual procedure is to loosen the clamp screw 26 and insert a master thread gage set plug (not shown) into the opening 16. If necessary, the adjusting screw 34 is tightened to expand insert 10 sufficiently to permit easy insertion of the set plug. In any event, the adjusting screw 34 is positioned so that opening 16 will be the proper size when the body 12 is contracted by clamp screw 26.

When split ring members such as insert 10 and body 12 are contracted by squeezing the spaced end portions thereof toward each other they tend to elongate in the plane of such ends. Thus the insert tends to elongate horizontally and the body to elongate vertically as they appear in the drawing. By arranging them with slots 18 and 24 substantially at right angles, any tendency of one to elongate is checked or compensated by the other. Forces tending to produce elongation of opening 16 are resisted by forces in the body 12 which tend to produce elongation of opening 22, and vice versa. As a result, these forces compensate each other, and substantially true circularity of the gage opening 16 is maintained throughout the range of adjustment.

Figure 5:
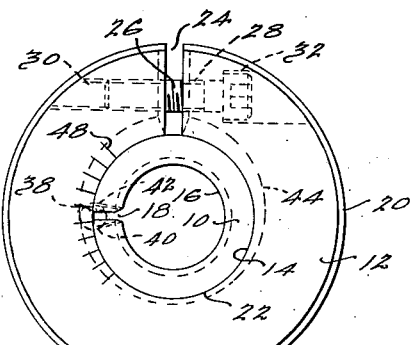
Fig. 5 is a plan view of a modified form of the invention.
Figure 6:
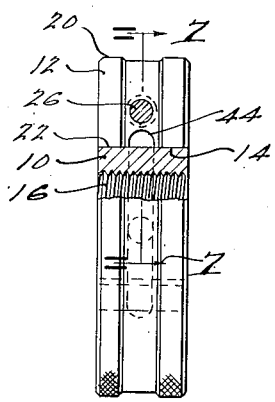
Fig. 6 is an edgewise elevational view of the form of the invention shown in Fig. 5, parts thereof being broken away and shown in section for clearness of illustration.
Figure 7:
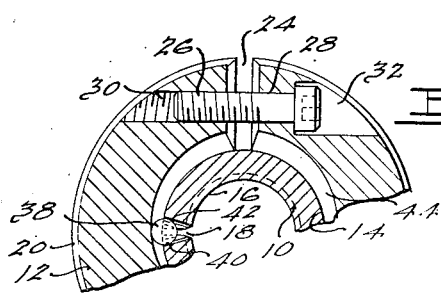
Fig. 7 is a fragmentary vertical sectional view taken on the line 7—7 of Fig. 6.

Attention is now directed to Figs. 5–7 which show a modified adjusting means for expanding the insert 10. In this form of the invention the adjusting screw 34 and threaded bore 36 are omitted, and the ball detent 38 is disposed in an annular groove or track 44 provided medianly in the wall of opening 22. In order to regulate or vary the expanding forces exerted against the insert 10 by ball detent 38 and in order that these forces may be maintained substantially constant in different adjusted positions of clamp screw 26, the recess 44 is disposed eccentrically to opening 22, as best shown in Figs. 5 and 7. The deepest portion of recess 44 preferably is coincident with the adjusting slot 24.

Adjustment of the gage is obtained by loosening clamp screw 26 and rotating the insert 10 manually within the body 12. Adjusting slot 18 serves as a reference mark and sweeps an index scale 48 on the body 12 during such rotation to show the adjusted position of the insert in the body. The master thread gage set plug is then threaded into opening 16 and clamp screw 26 tightened in the manner hereinabove described to complete the adjustment.

Manifestly this form of the invention not only maintains true circularity of the opening 16 in all adjusted positions of the gage but it also is exceedingly simple to operate. In order to adjust the size of gage opening 16 it is necessary merely to loosen clamp screw 26, manually rotate insert 10 to the desired position, and then tighten the clamp screw.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, we claim:

1. A ring gage comprising an inner gaging member having a radial through slot defining spaced ends which permit radial adjustment of said member; and an outer body around the gaging member, said body having a radial through slot positioned substantially at right angles to the through slot in said gaging member and provided with an internally threaded radial bore disposed in alignment with the through slot in said gaging member; means for drawing the body solidly against said gaging member; an adjusting screw in said bore; and means actuated by said adjusting screw engageable with the spaced ends of the gaging member to expand the latter radially outwardly against said body.

2. A ring gage comprising an inner gaging member having a radial through slot defining spaced ends; and an outer body around the gaging member, said body having a radial through slot positioned substantially at right angles to the through slot in said gaging member and provided with an internally threaded radial bore disposed in alignment with the through slot in the gaging member; means for contracting the body against said gaging member; an adjusting screw in said bore; and a spherical element confined between the adjusting screw and the insert, said element seating against the spaced ends of the gaging members and reacting thereagainst to expand the same radially outwardly against the body when the adjusting screw is tightened.

3. A ring gage comprising an annular radially adjustable body, an annular insert fitting snugly in said body and provided with spaced ends which permit radial expansion and contraction of the same, said body provided with a recess disposed in confronting relation to the spaced ends of the insert, and a detent disposed in said recess and seating against the spaced ends of said insert whereby contraction of the body applies radially contracting forces against the insert and presses the detent against the spaced ends of said insert to expand the latter against the body.

4. A ring gage comprising an insert having a central opening for testing work and provided with a radial through slot which defines spaced ends; an annular body around and snugly fitting the insert, said body being radially adjustable and also adapted for rotative movement around the insert, said body further provided with an elongated recess or track which opens against the periphery of the insert, the bottom of said track arranged eccentrically with respect to said peripheral surface; and a ball detent disposed in said track, said detent entering the through slot of the insert and seating against said spaced ends whereby contraction of the body forces the detent against the spaced ends of the insert to expand the latter and whereby the expanding force exerted by the detent is regulated by relative rotative movement between the body and insert.

5. A thread ring gage comprising concentric inner and outer essentially annular members each having a radial through slot, said inner member having an internally threaded hole for receiving work to be tested, and said slots disposed approximately at right angles to each other; an adjusting member positioned to enter the through slot in said inner member, each wall of said slot having angularly related radially inwardly tapered bearing surfaces which seat said adjusting member; and a clamping screw for tightening the outer member solidly against said inner member whereby the body imposes radially contracting forces which contract the insert and also act against said bearing surfaces through the adjusting member to expand the insert radially outwardly against the body, said bearing surfaces so constructed and arranged that pressure exerted thereagainst by said adjusting member flexes the ends of said inner member axially in opposite directions to compensate offset of the internal threads at opposite sides of the slot due to such contraction.

6. A thread ring gage comprising concentric inner and outer members rotatable relative to each other, said inner member having a concentric internally screw-threaded hole adapted to receive work to be tested and provided with a radial through slot, said outer member having a radial through slot normally positioned approximately at right angles to the through slot in said inner member and provided with an inner annular recess or track which opens against the peripheral surface of said inner member, the bottom of said track disposed eccentrically to said peripheral surface; an adjusting member disposed in said track in confronting relation to the slot in said inner member, each wall of said slot having angularly related, radially inwardly tapered bearing surfaces disposed to engage the adjusting member; and a clamping screw for tightening said outer member against said inner member whereby radially contracting forces exerted by said outer member contract the insert and also act against the bearing surfaces through said adjusting member to expand said inner member, pressure against said bearing surfaces being regulated by rotating said inner and outer members relative to each other, said bearing surfaces so constructed and arranged that pressure exerted thereagainst by the adjusting member flexes the ends of said inner member axially in opposite directions to compensate for offset in the internal threads at opposite sides of the slots due to radial adjustment of said inner member.

GEORGE HOHWART.
ERNEST F. HOHWART.

REFERENCES CITED

The following references are of record in the file of this patent:

UNITED STATES PATENTS

| Number | Name | Date |
|---|---|---|
| 664,995 | Ernst | Jan. 1, 1901 |
| 1,487,803 | Peterson | Mar. 25, 1924 |
| 1,913,674 | Kaufmann | June 13, 1933 |
| 2,353,626 | Schnaars | July 11, 1944 |